United States Patent [19]

Iizuka et al.

[11] Patent Number: 4,757,412
[45] Date of Patent: Jul. 12, 1988

[54] DISK CARTRIDGE

[75] Inventors: Michio Iizuka, Saku; Haruo Shiba, Komoro, both of Japan

[73] Assignee: TDK Corporation, Tokyo, Japan

[21] Appl. No.: 23,916

[22] Filed: Mar. 5, 1987

Related U.S. Application Data

[63] Continuation of Ser. No. 753,786, Jul. 11, 1985, abandoned.

[30] Foreign Application Priority Data

Jul. 21, 1984 [JP] Japan ............................ 59-110683[U]

[51] Int. Cl.$^4$ ............................................ G11B 23/03
[52] U.S. Cl. .................................................... 360/133
[58] Field of Search ........................................ 360/133

[56] References Cited

U.S. PATENT DOCUMENTS 4,490,764 12/1984 Butz .................................... 360/133

FOREIGN PATENT DOCUMENTS 0133541 2/1985 European Pat. Off. .
1507620 4/1978 United Kingdom .
2048548 12/1980 United Kingdom .
2074364 10/1981 United Kingdom .
2108309 5/1983 United Kingdom .

OTHER PUBLICATIONS

Johnson et al, "Cartridge . . . Disk", IBM Tech. Disc. Bull., vol. 21, No. 10, Mar. 1979, p. 4192.

Primary Examiner—Robert S. Tupper
Attorney, Agent, or Firm—Oblon, Fisher, Spivak, McClelland & Maier

[57] ABSTRACT

A disk cartridge comprises a hard casing in which a magnetic disk is rotatably contained, wherein a wear-resistance material is provided at at least a part of a contacting area between a hub of the magnetic disk and the hard casing.

4 Claims, 2 Drawing Sheets

DISK CARTRIDGE

This application is a continuation of application Ser. No. 753,786, filed on July 11, 1985, now abandoned.

BACKGROUND OF THE INVENTION

The present invention relates to a disk cartridge comprising a hard casing in which a magnetic disk is contained in a rotatable manner.

A floppy disk has widely been used as an exchangeable information storage medium which can be mounted on a driving unit and removed from it for storage and transportation in the same manner as a magnetic tape cassette or a disk pack.

Especially, a small-sized floppy disk, which is smaller than an ordinary floppy disk, is commonly used for personal computers because of an economical price. In this type of floppy disk, a thin flexible jacket is used as a casing to protect a magnetic disk. The thin flexible jacket is, however, insufficient to protect the magnetic disk. On account of this, there is proposed a disk cartridge in which a magnetic disk is rotatably contained in a thick, undeformable, strong, hard casing whose inner surfaces are attached with lining sheets.

FIG. 1 is a longitudinal cross-sectional view showing the above-mentioned disk cartridge being mounted on the driving unit. In FIG. 1, a reference numeral 10 designates an upper hard casing; a numeral 12 designates a lower hard casing and a numeral 14 designates a magnetic disk. The magnetic disk 14 is rotatably contained in the upper and lower hard casings 10, 12 whose inner surfaces are bonded with lining sheets (not shown). The magnetic disk 14 comprises a circular plate-like magnetic sheet 16 and a hub 18 at the central part of the magnetic sheet 16. The hub 18 is made of metal and comprises a central circular recess 20 as the major part and an annular part 22 extending from the outer periphery of the circular recess 20. In the central part of the inner surface of the upper hard casing 10, there is formed an annular pojection 24. The free end portion of the annular projection extends in the circular recess 20 of the hub to restrict a region of rotation of the magnetic disk 14.

When the disk cartridge is mounted on the driving unit, a driving pin 26 of the driving unit is inserted into the central opening of the hub 18 and the top end of the pin reaches a bearing part 28 positioned in the central portion of the upper hard casing 10, whereby the magnetic disk 14 is suspended in the upper and lower hard casings 10, 12 to be in a freely rotatable condition. In FIG. 1, numerals 30, 32 respectively designate supporters upwardly extending from the driving unit to support the disk cartridge.

However, when the disk cartridge having the construction as above-mentioned is mounted on the driving unit, it is inavoidable that the hub 18 is pushed up by the driving pin 26, whereby the hub 18 temporarily comes in contact with the inner surface of the upper hard casing 10. Further, the driving unit is generally provided with two driving pins 26 to enhance accuracy in driving operation: one enters the central opening of the hub 18 and the other enters another opening. Though it is easy to insert the driving pin into the central opening, insertion of the other driving pin into the other opening is not easy, on account of which the top end of the other driving pin 26 pushes up the hub 18 until it enters the other opening. When the hub 18 is raised, it is brought into contact with the inner surface of the upper hard casing 10. If they repeatedly come in contact with each other, the inner surface of the upper hard casing 10 is shaved by the hub to produce powder from the casing. Particularly, production of powder is notable when the hub 18 is made of metal and the upper hard casing 10 is made of resinous material. The shaved powder is harmful to operation. When the powder is deposited on the surface of the magnetic sheet 16, there results an adverse affect on operation of the magnetic disk and in the worst case, it becomes inoperative.

SUMMARY OF THE INVENTION

It is an object of the present invention to eliminate the disadvantage of the conventional disk cartridge and to provide an imporved disk cartridge minimizing production of harmful powder by providing a protective means in at least a part of a contacting area between a hub and a hard casing when the disk cartridge is mounted on a driving unit.

The present invention is to provide a disk cartridge comprising a hard casing in which a magnetic disk is rotatably contained, characterized in that a wear-resistance material is provided at at least a part of a contacting area between a hub of the magnetic disk and a hard casing.

DETAILED DESCRIPTION OF THE PREFERRED EMBODIMENTS

Figure 1:
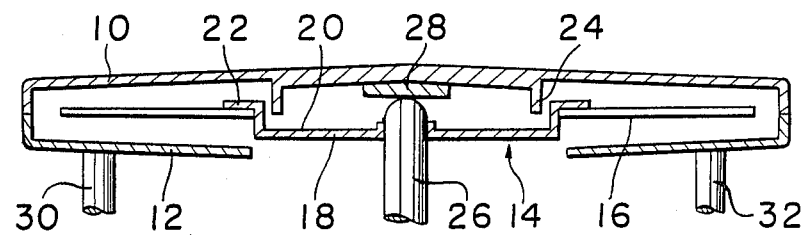
FIG. 1 is a longitudinal cross-sectional view of a conventional disk cartridge.
Figure 2A:
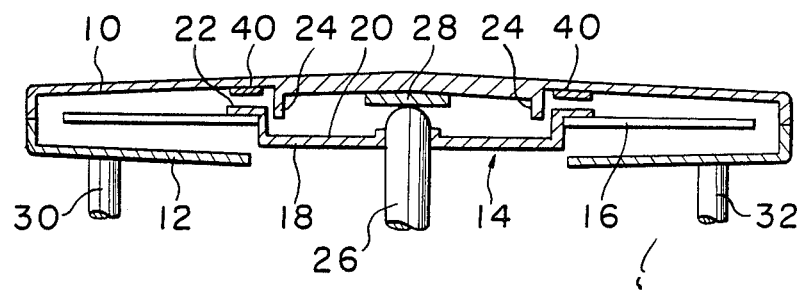
FIG. 2A longitudinal cross-sectional view of a first embodiment of the disk cartridge according to the present invention.
Figure 2B:
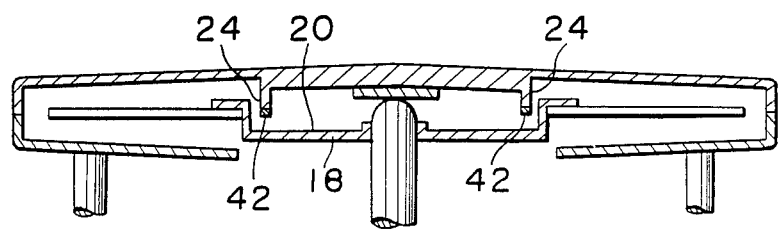
FIG. 2B is a longitudinal cross-sectional view of a second embodiment of the present invention.
Figure 3A:
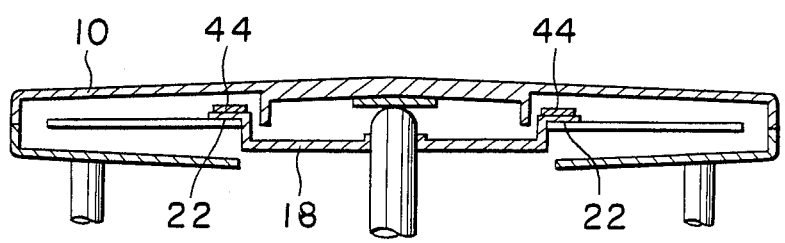
FIG. 3A is a longitudinal cross-sectional view of a third embodiment of the present invention.
Figure 3B:
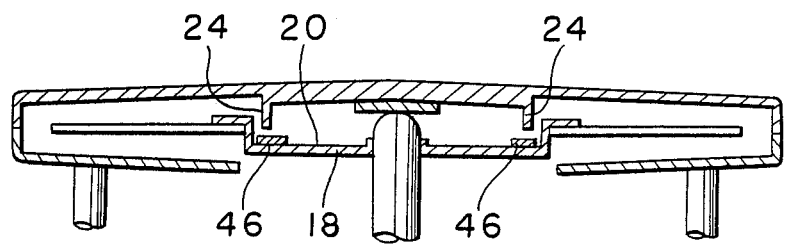
FIG. 3B is a longitudinal cross-sectional view of a fourth embodiment of the present invention.

Preferred embodiments of the present invention will be described with reference to drawing. FIGS. 2A and 2B respectively show disk cartridges of the present invention in which a wear-resistant material is provided in the upper hard casing with which a hub comes in contact and FIGS. 3A and 3B show the disk cartridges in which a wear-resistance material is provided on the hub itself which comes in contact with the inner surface of the upper hard casing. In the Figures, the same reference numerals designate the same parts and therefore, description of these parts is omitted. In comparison to the embodiments of the present invention with the conventional disk cartridge, difference in the construction resides in that a wear-resistance material such as a coating layer of synethetic rubber having wear-resistance properties is provided on at least a part of a contacing area between the hub and the upper hard casing so that they indirectly come in contact with each other through the wear-resistance material.

In FIG. 2A, a wear-resistance material 40 of an annular form is attached to the inner surface of the upper hard casing 10 and outside the annular projection 24 of it. Accordingly, the wear-resistance material 40 coveres the inner surface of the upper hard casing 10 which faces the annular part 22 of the hub 18, whereby direct contact between the annular part 22 of the hub and the inner surface of the upper hard casing 10 can be prevented.

FIG. 2B shows a second embodiment of the present invention. A wear-resistance material 42 is provided at and near the annular projection 24 projecting from the upper hard casing 10. Accordingly, direct contact between the annular projection 24 and the inner surface of the circular recess 20 of the hub 18 can be prevented.

FIG. 3A shows a third embodiment of the present invention. A wear-resistance material 44 is provided on the annular part 22 of the hub 18 opposing the inner surface of the upper hard casing 10. Accordingly, direct contact between the inner surface of the upper hard casing 10 and the hub 18 can be prevented because at least a part of the surface of the annular part 22 of the hub facing the inner surface of the upper hard casing 10 is covered by the wear-resistance material 44.

FIG. 3B is a longitudinal cross-sectional view of a fourth embodiment of the present invention. In the embodiment, a wear-resistance material 46 is provided in an annular form at the outer peripheral part of the inner surface of the circular recess 20. The wear-resistance material 46 in an annular form is opposed to the annular projection 24 of the upper hard casing so that direct contact between the circular recess 20 of the hub and the annular projection 24 of the upper hard casing can be prevented.

In accordance with the present invention, a wear-resistance material 40, 42, 44 or 46 is provided at at least a part of a contacting area between the hub 18 of a magnetic disk and a hard casing 10, namely, the contacting area in the upper hard casing 10 or the contacting area in the hub 18. Accordingly, the hub 18 is indirectly brought into contact with the upper hard casing 10 even when it comes contact with the upper hard casing at the time of mounting a disk cartridge on the driving unit.

We claim:

1. A disk cartridge comprising:
   a hard casing having an upper case including a central bearing part;
   a magnetic disk rotatably held in said hard casing, said magnetic disk having a hub engageable with said casing at a contact area; and
   a wear-resistance material separate from said central bearing part and provided on at least a part of said contact area between said hub and said upper case, said wear resistance material having wear resistance properties, whereby wear of said hub is reduced,
   wherein said casing has an annular projection and said hub has a circular recess, said projection and recess defining said contact area, and wherein said wear-resistance material is provided at and near an end of said annular projection opposite said circular recess.

2. The disk cartridge according to claim 1, wherein said wear-resistance material is a synthetic rubber having wear-resistance properties.

3. A disk cartridge comprising:
   a hard casing having an upper case including a central bearing part;
   a magnetic disk rotatably held in said hard casing, said magnetic disk having a hub engageable with said casing at a contact area; and
   a wear-resistance material separate from said central bearing part and provided on at least a part of said contact area between said hub and said upper case, said wear-resistance material having wear-resistance properties, whereby wear of said hub is reduced,
   wherein said casing has an annular projection and said hub has a circular recess, said projection and said recess defining said contact area, and wherein said wear resistance material is provided at an outer peripheral portion of said circular recess.

4. The disk cartridge according to claim 3, wherein said wear-resistance material is a synthetic rubber having wear-resistance properties.

* * * * *